United States Patent [19]

Vidovic

[11] 3,761,910

[45] Sept. 25, 1973

[54] DETECTOR OF MOTION IN A SCANNED FIELD

[75] Inventor: Jovan V. Vidovic, Belgrade, Yugoslavia

[73] Assignee: Quality Engineering Associates Inc., Indianapolis, Ind.

[22] Filed: Mar. 2, 1972

[21] Appl. No.: 231,315

[52] U.S. Cl. .......... 340/258 R, 178/DIG. 33, 328/5, 340/221

[51] Int. Cl. .......... G08b 13/22

[58] Field of Search .......... 340/258 R, 221; 178/5.4 ES, DIG. 38, DIG. 33; 328/5

[56] References Cited

UNITED STATES PATENTS

| | | | |
|---|---|---|---|
| 3,488,436 | 1/1970 | Burney | 178/DIG. 38 |
| 3,531,588 | 9/1970 | Kartchner | 178/DIG. 33 |
| 3,678,492 | 7/1972 | Casper | 340/258 B |

*Primary Examiner*—John W. Caldwell
*Assistant Examiner*—Glen R. Swann, III
*Attorney*—C. David Emhardt et al.

[57] ABSTRACT

A circuit for use with a scanning device, such as a television camera, detects motion in the area viewed by the scanning device. The circuit detects changes in the levels of one or more of the harmonics of the scanning frequency in the output of the scanning device. When such a change is detected an alarm is triggered.

12 Claims, 4 Drawing Figures

DETECTOR OF MOTION IN A SCANNED FIELD

BACKGROUND OF THE INVENTION

The invention relates generally to motion detectors. Such detectors are generally used in burglar alarm systems.

Numerous devices have been used in the prior art to detect motion in a scene surveyed by a scanning device. One device uses a television camera and has a delay line which stores one frame. The second frame is then compared to the first one and any voltage difference will be detected as a motion on the scene.

Another device uses a television camera and detects peak and average value of a keyed video signal. While these devices work well, they are expensive and cumbersome.

SUMMARY OF THE INVENTION

The present invention relates to a motion detector which detects motion by sensing, at the output of a scanning device, a change in the average level of one or more harmonics of the sweep frequency of the scanning device. The invention can be implemented very economically and in a disclosed embodiment it uses the video signal from a television camera.

The basic concept of the invention is applicable to devices which use ultrasonics, or microwaves for scanning as well as optical scanning. It will be clear that the scanning need only be one dimensional, thus vertical scanning of a television camera is unnecessary. However, it is clearly preferred that both horizontal and vertical scanning be used (or a circular sweep) to provide a larger area of surveillance. Furthermore it is clearly preferred that a conventional television camera provide the signal used by the motion detector.

DESCRIPTION OF THE PREFERRED EMBODIMENT

The preferred embodiment of the invention employs a standard television camera which scans 30 frames/-second with a horizontal scan rate of 15,750 lines/-seconds. It should be understood, however that the invention can be used with scanning devices which have other scan rates or which operate on a different principle than a television camera. What is essential is that the scanning device repetitively scans over the same area to produce a signal with a characteristic sweep frequency at its output.

It is well known that a video signal can be thought of as consisting of line and field harmonics which amplitudes carry information about a scene. Thus for any change in the monitored scene essentially all harmonics will change amplitudes. Some will increase and some will decrease. The preferred embodiment of my invention correlates these changes in harmonics of the horizontal scan rate to motion in the area being scanned.

Figure 1:
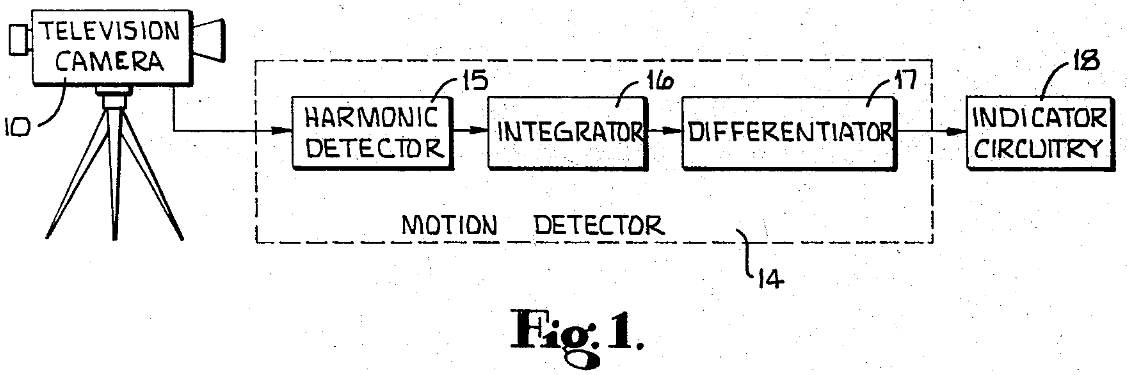
FIG. 1 is a block diagram of apparatus which is for detecting motion and which incorporates the invention.

Referring in particular to FIG. 1 there is illustrated a conventional television camera 10 which has a composite output feeding a motion detector 14. An indicator circuitry 18 is responsive to either positive or negative pulses from the motion detector 14 and it produces an indication if there is or has been such a signal at the output of the motion detector. The motion detector 14 includes a harmonic detector 15, an integrator 16 and a differentiator 17.

Figure 2:
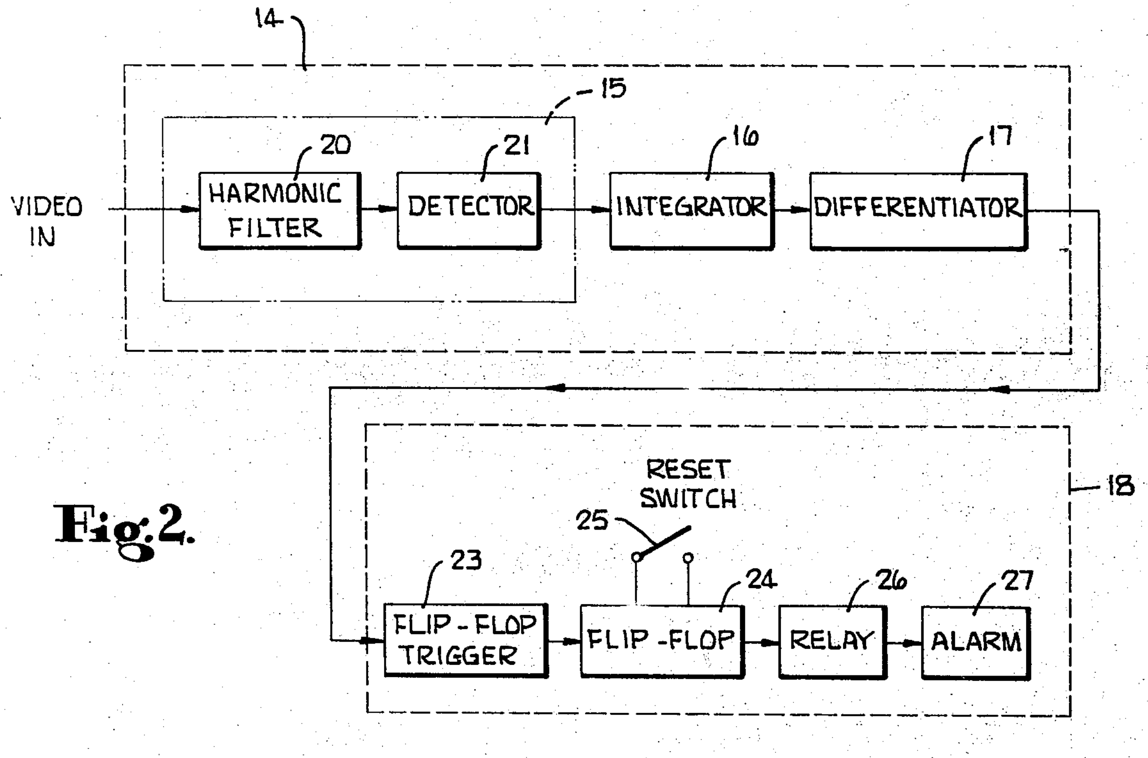
FIG. 2 is an expanded block diagram of a portion of FIG. 1, showing an embodiment where only one harmonic of a video signal is detected.

As shown in FIG. 2 one embodiment of the invention illustrated in FIG. 1 includes as a harmonic detector 15, a harmonic filter 20 and a detector 21. The harmonic filter is tuned to a harmonic of the horizontal sweep frequency of the video signal from the television camera. The filtered signal then passes to an envelope detector 21. The output of the detector 21 is then integrated by integrator 16 which has a time constant of over 33 milliseconds, around 300 milliseconds being preferred. The time constants chosen will depend, of course, upon the nature of the scanning device being used. For a conventional television camera it has been found that a time constant of less than 33 milliseconds is unsatisfactory. The differentiator 17 then differentiates the output of the integrator 16 to sense any change in the level of the output of the integrator 16. The time constant of the differentiator should be greater than the time constant of the integrator.

In FIG. 2 the indicator circuitry of FIG. 1 is illustrated in more detail. The output of the motion detector 14 connects to a flip-flop trigger 23 which is responsive to either positive or negative pulses from the motion detector 14. Upon receipt of either a positive or negative pulse, the flip-flop trigger will cause flip-flop 24 to activate relay 26 which will cause alarm 27 to sound. A reset switch will return the flip-flop to its untriggered state.

Figure 3:
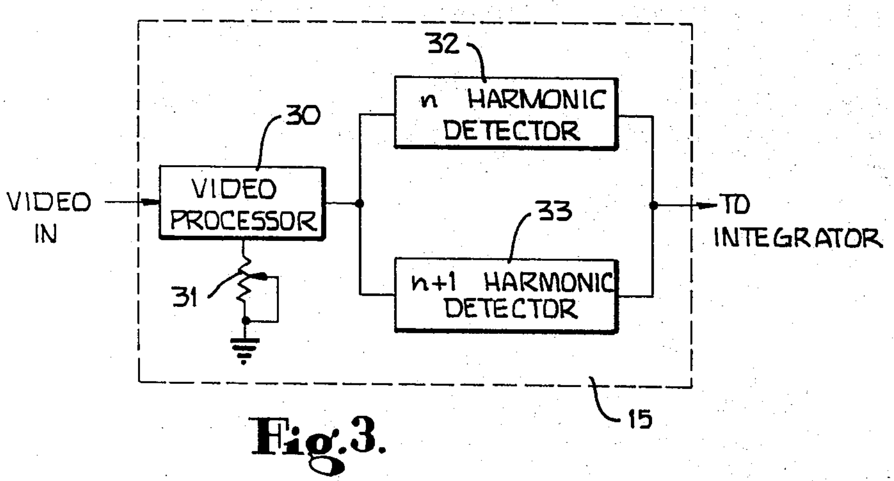
FIG. 3 is an expanded block diagram of a portion of FIG. 1, showing an embodiment where two harmonics of a video signal are detected.

FIG. 3 illustrates a harmonic detector 15 of FIG. 1 which detects two harmonics of the horizontal sweep frequency of the video signal from the television camera. The video signal is processed by a video processor 30 whose gain is controlled by potentiometer 31. The output of this processor is then fed to two harmonic detectors 32 and 33. Harmonic detector 32 detects the level of one integer harmonic of the horizontal sweep frequency and harmonic detector 33 detects the next higher integer harmonic of the horizontal sweep frequency.

Figure 4:
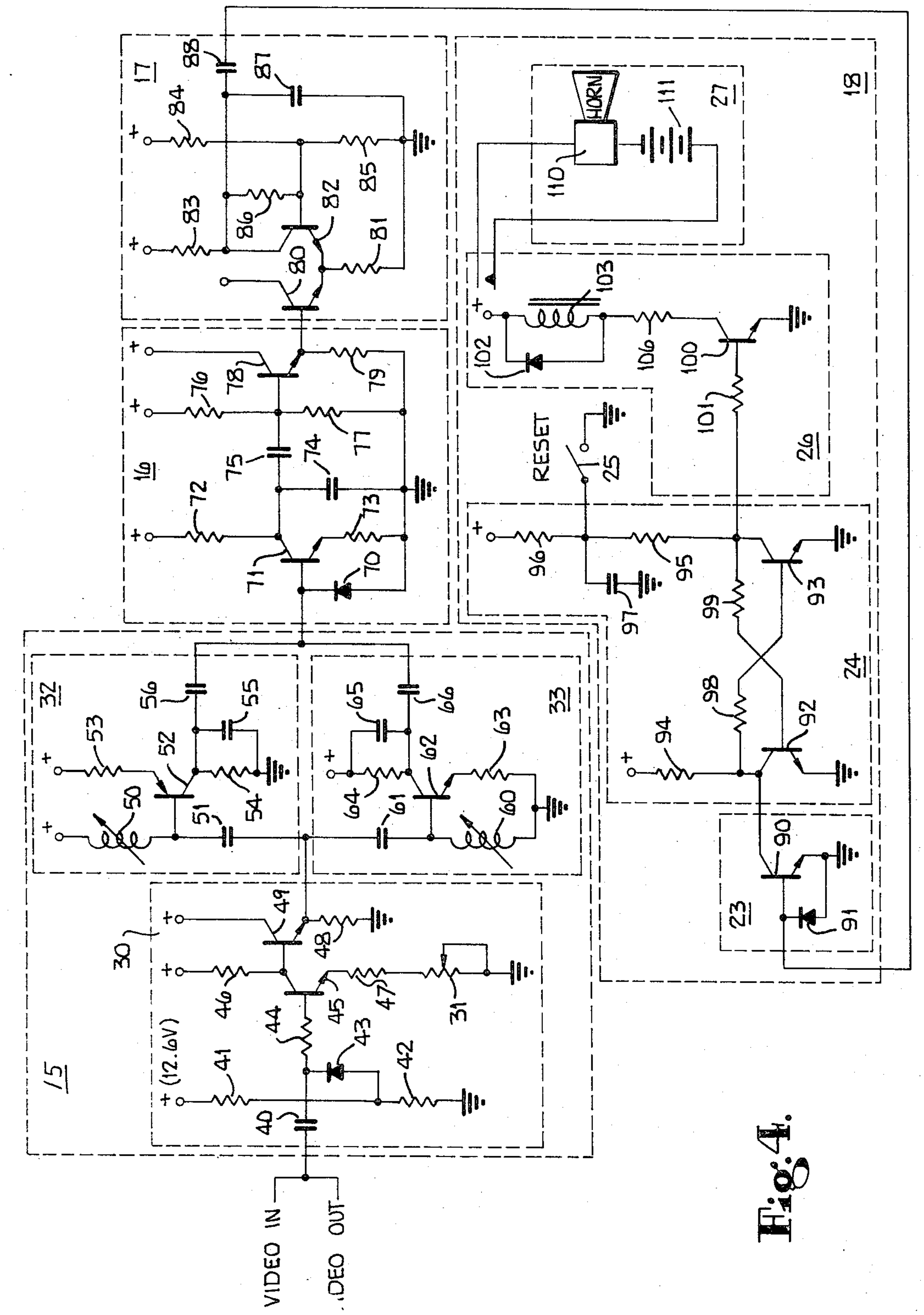
FIG. 4 is a circuit diagram of the embodiment of FIG. 3.

Referring in particular to FIG. 4, there is illustrated in detail the circuit of FIGS. 1 and 3. This circuit is appropriate for video signals which have both video information and sync. Such video signals are known as composite video signals. The video signal is coupled to the motion detector through a capacitor 40 and the sync portion of the signal is clipped by the action of diode 43 and a reference potential determined by resistors 41 and 42. Transistor 45 and its biasing resistors 44, 46, 47 and 31 amplify the video signal. Potentiometer 31 adjusts the gain of transistor 45 so that the proper level signal is obtained. Transistor 49 with an emitter resistor 48 provides additional gain and isolation.

The harmonic detectors 32 and 33 connect to the output of the video processor 30 just described. Harmonic detector 32 has an LC circuit tuned to an integer harmonic of the horizontal scan frequency. The conventional scan frequency used in the United States is 15,750 Hz. The LC circuit of capacitor 51 and variable inductor 50 selects an integer harmonic which then passes to an envelope detector which includes transistor 52 and resistors 53 and 54 and capacitors 55 and 56. Harmonic detector 33 is tuned to an adjacent harmonic and operates in essentially the same way. The two outputs of the harmonic detector 32 and 33 are combined and connect to integrator circuitry in integrator 16. Diode 70 is used as a D.C. restorer and transistor 71 and its biasing resistors 72 and 73 and capacitors 74 and 75 integrate and amplify the signal. An additional amplifying stage including transistors 78 and resistors 76, 77 and 79 amplifies the integrated signal and isolates the integrating stage. Differentiator 17 has a differential amplifier which is driven by transistor 80 and which includes transistor 82 and resistors 81, 83, 84 and 85 and 86 and capacitors 87 and 88.

Acceptable values for the components in the detector, integrator, and differentiator stages are as follows:

| | |
|---|---|
| Inductors 50 and 60 | 1–3 mh |
| Capacitors 51 and 61 | 560 pf |
| Capacitors 55, 56, 65 and 66 | 0.1 μf |
| Capacitors 74, 75 and 88 | 100 μf |
| Capacitor 87 | 50 μf |
| Resistors 53 and 63 | 220 ohms |
| Resistors 54 and 64 | 10,000 ohms |
| Resistor 72 | 3,300 ohms |
| Resistor 73 | 330 ohms |
| Resistor 76 | 47,000 ohms |
| Resistor 77 | 12,000 ohms |
| Resistor 79 | 2,200 ohms |
| Resistor 81 | 150 ohms |
| Resistor 83 | 1,800 ohms |
| Resistors 84 and 86 | 27,000 ohms |
| Resistor 85 | 2,700 ohms |

Flip-flop trigger 23 includes a diode 91 and a transistor 90 which, due to capacitor 88, is reponsive to either positive or negative pulses. Transistor 90 controls a flip-flop 24 which consists of transistors 92 and 93 and resistors 94, 95, 96, 98 and 99 and capacitor 97. It is of conventional design and may be reset by the closure of switch 25.

The flip-flop controls the relay circuit 26 which has a relay 103 controlled by transistor 100 and a current limiting resistor 106. A fly back damping diode 102 is present to limit the inductively produced voltages. The relay is shown controlling an alarm 27 which includes a battery 111 in series with a horn 110. Obviously any type of indicating device may be used with this invention whether it be a horn, light, meter, bell, etc.

While there have been described above the principals of this invention in connection with a specific apparatus, it is to be clearly understood that this description is made only by way of example and not as a limitation to the scope of the invention.

What is claimed is:

1. Apparatus for detecting motion in an area which comprises:
   a. a scanning device for producing a signal having a characteristic sweep frequency at its output;
   b. a harmonic detector coupled to the output of said scanning device for detecting the level of at least one harmonic of said sweep frequency;
   c. an integrator connected to the output of said harmonic detector for obtaining an average value of said output; and
   d. a differentiator connected to the output of said integrator for detecting a change in the output of said integrator whereby a signal at the output of said differentiator will correspond to motion in the area under surveillance by said scanning device.

2. The apparatus of claim 1 in which said scanning device is a television camera.

3. The apparatus of claim 1 in which said differentiator has a longer time constant than said integrator.

4. The apparatus of claim 2 in which said integrator has a time constant of over 33 milliseconds.

5. The apparatus of claim 1 which additionally has an indicator means for indicating if there is or has been a signal at the output of said differentiator .

6. The apparatus of claim 5 in which said indicator means includes a flip-flop circuit.

7. The apparatus of claim 5 in which said indicator means is responsive to either positive or negative pulses.

8. The apparatus of claim 1 in which said harmonic detector detects the level of at least two harmonics of said sweep frequency.

9. The apparatus of claim 2 in which said television camera has a composite video output and in which there is additionally a video processor which connects to said composite video output of said camera, said processor having means for reducing the sync level of a video signal from said television camera.

10. The apparatus of claim 9 in which said differentiator has a longer time constant than said integrator and said integrator has a time constant of over 33 milliseconds.

11. The apparatus of claim 10 which additionally has an indicator means for indicating if there is or has been a signal at the output of said differentiator.

12. The apparatus of claim 11 in which said harmonic detector detects the level of at least two harmonics of said sweep frequency.

* * * * *